United States Patent [19]

Sack

[11] Patent Number: 4,926,760
[45] Date of Patent: May 22, 1990

[54] SELF LEVELING TABLES

[76] Inventor: Allen J. Sack, 3 Township Rd., Waseca, Minn. 56093

[21] Appl. No.: 302,684

[22] Filed: Jan. 27, 1989

[51] Int. Cl.[5] .............................................. A47B 9/02
[52] U.S. Cl. ...................................... 108/145; 248/421; 248/588
[58] Field of Search .............. 108/145, 146, 147, 136, 108/144; 248/157, 182, 183, 277, 575, 421, 588; 312/306, 312

[56] References Cited

U.S. PATENT DOCUMENTS

| | | |
|---|---|---|
| 432,034 | 7/1890 | Goss . |
| 2,531,140 | 11/1950 | Linde ................................. 108/145 |
| 2,581,023 | 1/1952 | Jerick ................................. 108/145 |
| 2,645,538 | 7/1953 | Segal ................................. 108/145 |
| 2,968,818 | 1/1961 | Petersen ........................... 248/588 |
| 3,203,670 | 8/1965 | Farris ................................. 108/147 |
| 3,282,566 | 11/1966 | Clarke ............................... 108/147 |
| 3,370,556 | 2/1968 | Kool ................................... 108/146 |
| 3,418,031 | 12/1968 | Fisher . |
| 3,741,512 | 6/1973 | Olsson ............................... 248/421 |
| 3,826,457 | 7/1974 | Huot de Longcha .............. 248/588 |
| 3,941,440 | 4/1976 | Menzin ............................... 312/71 |
| 4,070,072 | 1/1978 | Skaller ............................... 312/71 |
| 4,125,242 | 11/1978 | Meiller et al. ..................... 248/421 |
| 4,149,762 | 4/1979 | Olsson et al. ....................... 312/71 |
| 4,448,386 | 5/1984 | Moorhouse et al. .............. 248/564 |
| 4,449,262 | 5/1984 | Jahsman et al. ................... 248/421 |
| 4,659,052 | 4/1987 | Nagata ............................... 248/421 |
| 4,764,075 | 8/1988 | Cox et al. ............................ 414/99 |
| 4,786,024 | 11/1988 | Goetz ................................. 248/422 |

Primary Examiner—Kenneth J. Dorner
Assistant Examiner—Brian K. Green
Attorney, Agent, or Firm—Jacobson & Johnson

[57] ABSTRACT

A self leveling table for holding articles on the table at a constant level regardless of the number of articles on the top of the table with the self leveling table including a pair of scissor arms that are restrained from closing by a set of springs whose compression force can be adjusted, the scissor arms pivotally mounted in the table with one end of the springs including a cam bar with a pair of cam followers for engaging cam surfaces on the scissors arms to smoothly control the raising and lowering of the self leveling table when materials are added or removed from the table and spaced lifting surfaces on the self leveling table, to permit an operator with a forklift to move the self leveling table.

11 Claims, 3 Drawing Sheets

4,926,760

SELF LEVELING TABLES

FIELD OF THE INVENTION

This invention relates generally to self leveling tables and, more specifically, to an adjustable self leveling table that automatically maintains the top of a stack of material on the table at a predetermined height without the aid of an external power source as portions of the material are removed from the table and also permits the user to move the self leveling table with a forklift.

BACKGROUND OF THE INVENTION

The concept of self leveling dispensers are well known in the art. Generally, the self leveling dispensers require some type of spring or other energy source to raise a platform as materials are removed from the dispenser. One of the difficulties of such prior art devices is that the devices generally do not level very smoothly over large distances or they have cumbersome framework that requires the user to continually work around the framework of the self leveling dispenser. In addition the framework usually prevents the dispenser from collapsing into a compact unit. The present invention provides a self leveling table that has no external framework to interfere with the raising or lowering of the dispenser or the loading or unloading of the dispenser and also permits the user to move a table with a forklift.

DESCRIPTION OF THE PRIOR ART

The 1890 Goss U.S. Pat. No. 432,034 shows an adjustable form table that uses a lever arm and gear rack to raise and lower the platform. An operator is required to raise and lower the table by moving the control lever.

The 1968 Kooi U.S. Pat. No. 3,370,556 shows a mechanical counterbalance system for a drafting table that uses a slideable carriage assembly to compensate for the variation in force supplied by the spring due to the movement of the table top. In order to raise or lower the table the operator is required to step on a foot pedal to release the table for upward and downward movement.

The 1968 Fisher U.S. Pat. No. 3,418,031 shows a floating platform that is located inside a walled container with a compression spring support and a pair of scissoring arms for providing stability The 1973 U.S. Pat. No. 3,741,512 shows a self leveling dispenser table that has a main compression spring and a set of torsion springs that are used to adjust the rate of resistance to displacement of the table.

The 1976 U.S. Pat. No. 3,941,440 shows a self leveling dispenser that uses a pulley and lever system with a tension spring that moves along a curved lever to adjust the moment on the arms of the dispenser.

The 1978 Skaller U.S. Pat. No. 4,070,072 shows a self leveling dispenser for supporting dishware with the self leveling dispenser having a set of different size tension springs that are elongated as the width on the cantilevered table top increases.

The 1979 Olsson U.S. Pat. No. 4,149,762 shows a self leveling dispenser that uses a pair of movable joined scissors and roller guides with the ends of the scissors having tension spring to center the scissors so that the main compression spring is maintained in a centered condition.

BRIEF SUMMARY OF THE INVENTION

Briefly, the present invention comprises a self leveling table that has no external power sources and has no external framework to hinder the unloading of the material from the table, yet provides a table that uses a folding gang of springs, a cam, and a cam follower to smoothly raise and lower the table in response to the weight on the table with the user able to move the table from place to place by inserting forklift arms into forklift regions that remain exposed for engagement of a forklift.

DESCRIPTION OF THE PREFERRED EMBODIMENT

Figure 1:
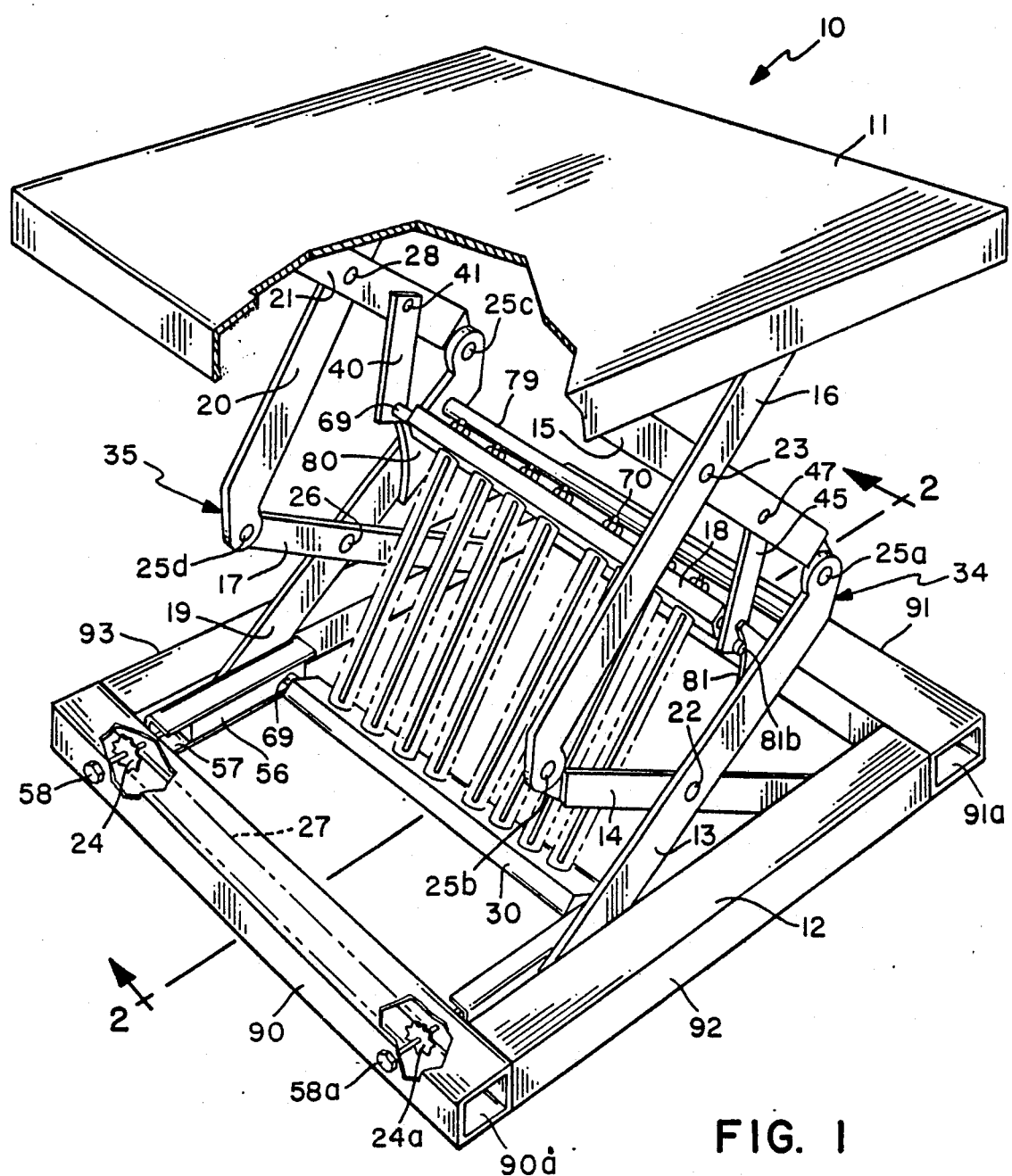
FIG. 1 is a perspective view of the self leveling table.
Figure 2:
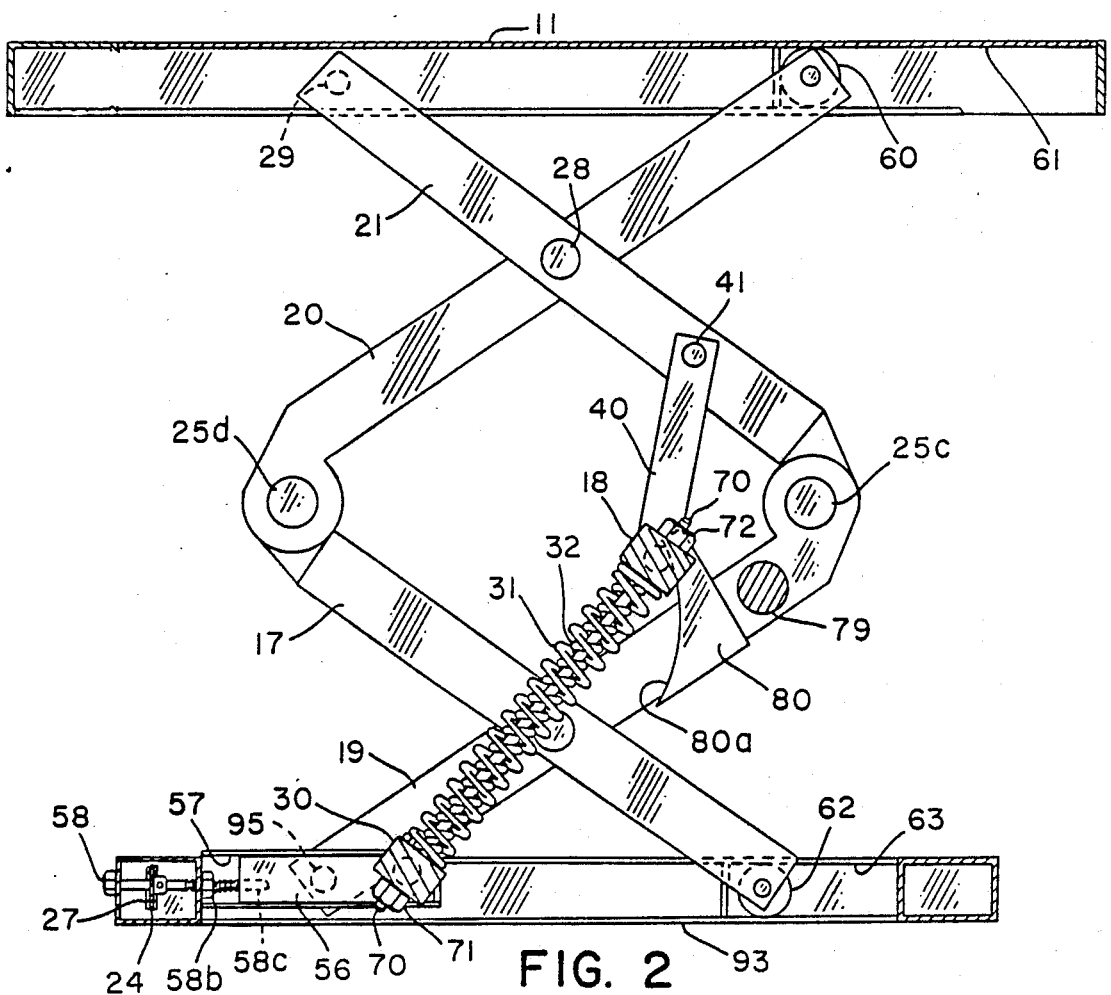
FIG. 2 is a sectional view taken along line 2—2 of FIG. 1 showing the spring and cam for smoothly raising and lower the self leveling table.
Figure 3:
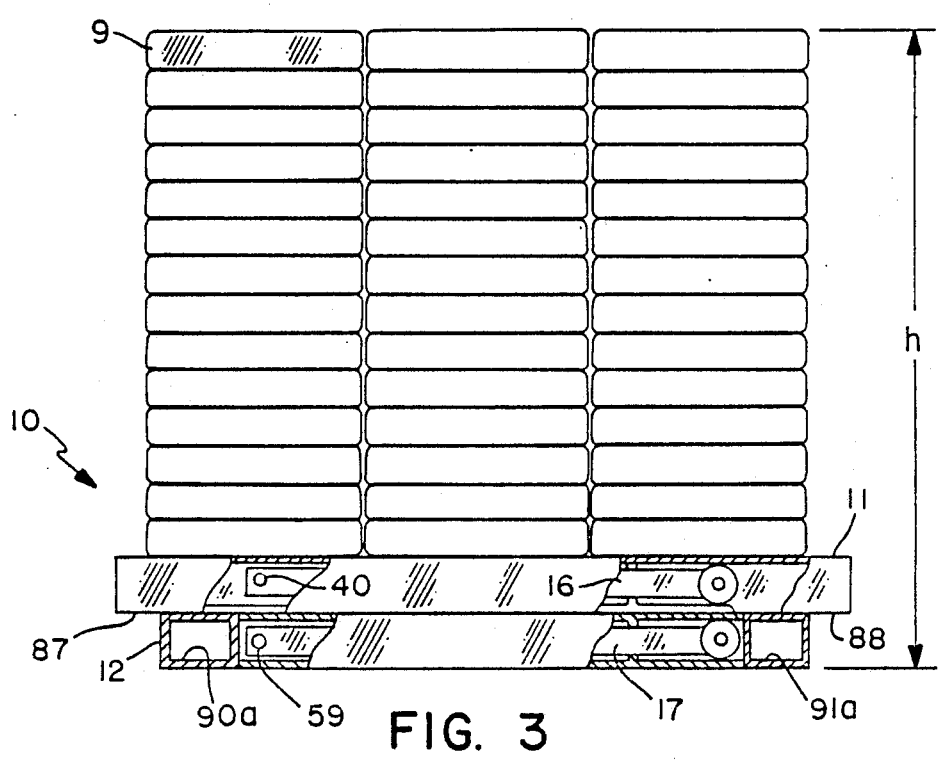
FIG. 3 is a front view of the self leveling table in the retracted condition due to a load of materials on the top of the self leveling table.
Figure 5:
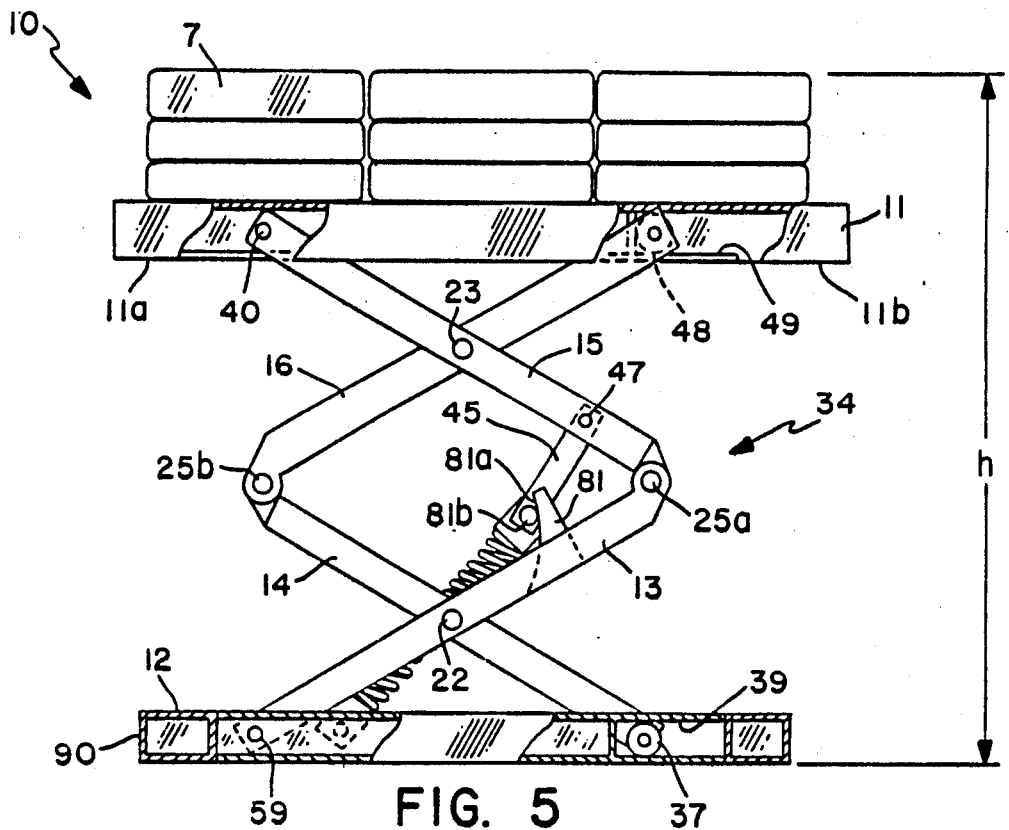
FIG. 5 is a front view of the self leveling table of FIG. 3 with substantially all of the material removed from the self leveling table.

Referring to FIG. 1, FIG. 2, and FIG. 5 reference numeral 10 general identifies the self leveling table of the present invention that comprises a generally rectangular flat table top 11 that is connected to main frame 12 through scissor arms 34 located on one side of self leveling table 10 and scissor arms 35 located on the opposite side of self leveling table 10. Table top 11 is sufficiently large so that it extends outside scissor arms 34, 35 and frame 12 as shown in FIG. 3. Scissor arms 34 comprise a first foldable member comprising arms 13 and 15 and a second foldable member comprising arms 14 and 16. Arm 13 has one end pivotally connected to frame 12 through a pivot pin 59 with the opposite end pivotally connected to arm 15 through a pivot hinge 25a. The opposite end of arm 15 pivotally connects to the inside of table top 11 through a pivot pin 40 (FIG. 5). Arm 14 has a roller 37 (FIG. 5) on one end that permits the roller to move back and forth in roller guide 39 (FIG. 5) in frame 12 as table top 11 is raised or lowered. The other end of arm 14 has a pivot hinge 25b that connects to one end of arm 16. The opposite end of arm 16 has a roller 48 (FIG. 5) that also moves back and forth in a roller guide 49 (FIG. 5) in table top 11 as the table is raised or lowered. In order to provide the scissoring action between the arms I pivotally connect arm 14 to arm 13 through a pivot pin 22 and arm 16 to arm 15 through a similar pivot pin 23.

Located on the opposite side of Table 10 is an identical scissor arm 35 that comprises members 17, 19, 20, and 21 that move up and down in unison with arms 13, 14, 15, and 16.

Referring to FIG. 2 the detail of the scissor arms 17, 19, 20, and 21 are shown in greater detail. Arm 19 has one end pivotally connected to frame 12 through a pivot pin 95 (shown in phantom) with the opposite end pivotally connected to arm 21 through a pivot hinge 25c. The opposite end of arm 21 pivotally connects to the inside of table top 11 through a pivot pin 29. The scissor arm 17 has a roller 62 on one end that moves back and forth in roller guide 63 in frame 12 as the table top 11 is raised or lowered. The other end of arm 17 has a pivot hinge 25d that connects to one end of arm 20. The opposite end of arm 20 has a roller 60 that also moves back and forth in a roller guide 61 in table top 11 as the table is raised or lowered. Both sets of scissor arms 34 and 35 are identical to one another and act in unison to raise and lower table top 11. A spacer bar 79 connects arm 19 to arm 13 to maintain the arms in a parallel spaced relationship as the scissor arms are raised or lowered.

FIG. 1 shows in phantom the set of compression springs 31 that are used to support and automatically raise and lower tabletop 11. As a safety feature I use multiple springs in the event that a spring may break. That is, the use of multiple springs allows the other springs to absorb the weight from a broken spring without having the table collapse or tilt over and spill the contents of the table top onto a user. Each of compression springs 31 comprises two concentrically located compression springs that are held in place by a single threaded rod having nuts located at each end of the threaded rod. FIG. 2 shows the spring holding structure used in each spring to comprise a threaded rod 70 that extends through spring 31, an interior spring 32, a pivot bar 30, and a cam bar 18 with nuts 71 and 72 holding compression spring 31 and compression spring 32 in compression between top cam bar 18 and lower pivot bar 30.

Threaded rod 70 with nuts 71 and 72 provide a means for the user to adjust the initial compressive forces produced by springs 31. In order to adjust the position of the lower end of bar 30 there is provided a first sliding pivot block 56 that pivotally holds one end of bar 30. Block 56 can be positioned along a guide 57 by turning a stud bolt 58 inward or outward (FIGS. 1 and 2). Stud bolt 58 has one end 58c that engages block 56 and a nut 58b that engages frame 12 to hold bolt 58 and block 56 in proper position. That is, by adjusting the lateral position of block 56 one can adjust the compressive force produced by springs 31 to compensate for loads that may be heavier or lighter. An identical sliding pivot block, guide (not shown), and stud bolt 58a are located on the opposites side of frame 12 to provide for lateral positioning of the opposite end of bar 30. In order to provide for the simultaneously adjustment of both ends of bar 30 I provide a spur gear 24 on bolt 58 and a spur gear 24a on bolt 58a with a link chain 27 connecting the spur gears together so that if one of the bolts 58 or 58a is turned the other one is also turned. This insures that the compressive forces will be adjusted evenly on both sides of the table 10.

Pivot bar 30, springs 31, cam bar 18 and members 40 and 45 provide a parallel spring bar linkage that can pivot about three axis. The first axis extends lengthwise through pivot bar 30, the second axis extends lengthwise through cam bar 18 and the third axis extends through a pivot pin 41 on arm 21 and a pivot pin 47 on arm 15. FIG. 1 shows one end of cam bar 18 pivotally connected to arm 40, which pivotally connects to arm 21, through pivot pin 41. The other end of cam bar 18 pivotally connects to one end of arm 45 with the opposite end of arm 45 pivotally connected to arm 15 through a pivot pin 47.

The spring bar linkage interacts with a first cam 80 located on arm 19 and a second cam 81 located on arm 13. Cam 81 has an arcuate cam surface 81a (FIG. 4) for cam follower 81b to follow. Cam follower 81b comprises a cylindrical extension from one end of cam bar 18. Similarly, located on the other side of table 11 is cam 80 (FIG. 2) that has a cam surface 80a for second identical cam follower (not shown) on the end of cam bar 18.

Figure 4:
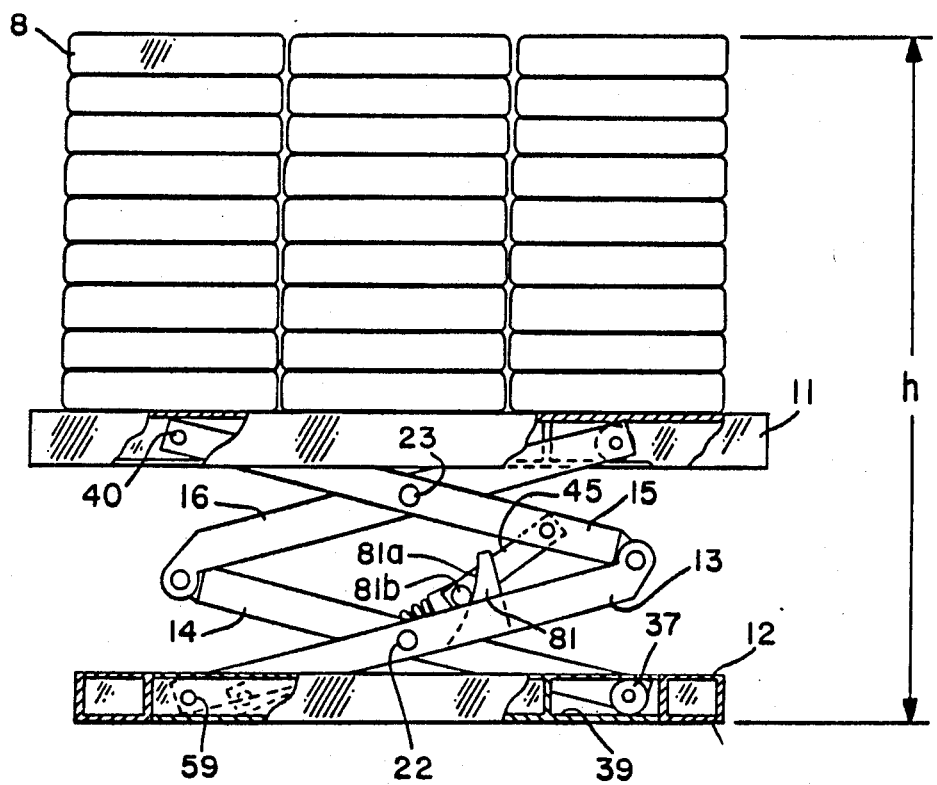
FIG. 4 is a front view of the self leveling table of FIG. 3 with a portion of the material removed from the self leveling table.

Cam 80 is securely fastened to arm 19 and cam 81 is securely fastened to arm 13 in an arrangement that produces a symmetrical mounting of the cams on the scissor arms on the opposite side of the self leveling table. Cam surface 80a and cam surface 81a both have identical shaped curved sufaces that form a guide for the cam followers on the ends of cam bar 18 as the springs 31 are compressed by the load on self leveling table 10. FIG. 4 and FIG. 5 illustrate the relative movement of the end of cam follower 81b on cam surface 81a. FIG. 4 shows self leveling table in a lowered position with cam follower 81b located about midway on cam surface 81a, while FIG. 5 shows cam follower 81b located near the top of cam surface 81a. The cam and cam follower located on the opposite side of table 10 are in identical positions to their counterparts.

In order to understand the operation of the present invention reference should be made to FIG. 3, FIG. 4, and FIG. 5 which show the present invention in its operating position with the topmost portion of the load of materials located a distance h from the floor support surface regardless of the size of the load on self leveling table 10.

FIG. 3 shows a full load of material 9 on table top 11 with the springs folded into the horizontal position and compressed until table top 11 rests on top of frame 12. One of the features of my invention is that the table top moves smoothly up and down as material is placed on or removed from the table top. In order to obtain the smooth raising and lowering of the table top and to still permit the table top to collapse to the position shown in FIG. 3 I provide folding springs and the cam in conjunction with the scissor arms to provide a linear displacement of the table top when weight is placed on top of the table top 11. If springs would be set vertically in my invention I could also provide for the linear displacement of the table top as weight is placed on or removed from the table top. However, in order to take advantage of the linear displacement of the springs would prevent the table top from collapsing on itself as shown in FIG. 3. That is as the springs are compressed they would reach a point where the displacement would not be linear or the springs would compress until the coils of the spring contact each other and thus stop downward motion of the table top. The present invention avoids the problem of the springs preventing the table from closing by having the springs fold downward and horizontally as the table is lowered. The downward folding action of the springs and the coaction with the cams on the scissor arms has been found to provide a linear displacement of the table top as a function of the weight on the table top throughout the entire range of the displacement of the table top. Thus the present invention provides for a self leveling dispener that smoothly raises and lowers with the removal or placement of articles on the self leveling table top.

In the embodiment shown I can collapse the table top down to a height of as low as 7 inches, have a travel of about 30 inche and a uniform displacement of the table top as a function of weight over a range of up to 1350 pounds. Other sizes could be made and the listing of dimensions and weights is for the purpose of illustrating the wide range of displacement that the self leveling table of the present invention can be moved through while providing a smooth displacement of the table top as a function of the weight of the articles on the self leveling table.

Frame 12 which is shown in perspective in FIG. 1 comprises parallel spaced members 90 and 91 that are joined by similar parallel spaced members 92 and 93 to form a rigid rectangular frame 12.

In order for a user to move table 10 an operator can place the stakes of a forklift under surfaces 87 and 88 which are located on the underside of table top 11.

Referring to FIG. 4 table 11 is shown with a partial load 8 on top of table top 11. In this condition relationship of the cam and cam followers is apparent. That is as the scissors arms on both sides of the table 10 begin to spring upward as the load is removed from table top 11 the cam follower 81b engages and follows along cam surface 81a on cam 81 while its counterpart on the opposite side follows the cam surface 80a on cam 80 (FIG. 2).

Referring to FIG. 5 the table top 11 is shown with a smaller load 7 and with the scissoring arms on opposite sides of the self leveling table in a further extended condition. In this condition the compression springs 31 have extended further causing the cam followers on the end of cam bar 18 to move further up on cam 81 and its cam counterpart 80 which is located on the opposite side of self leveling table 10. The result of the cam and cam follower action is that the springs compress with a portion of the load being supported by the cam followers that engage the cam surfaces 80a and 81a which produces a smooth raising and lowering action of the table top 11.

I claim:

1. A self leveling table having a top for holding stacked articles on the top of the self leveling table comprising:
    a table top for holding stacks of articles;
    a frame for supporting the self leveling table on a work surface; and
    a pair of scissor arms for raising and lowering the table top each of said pair of scissor arms including two foldable members pivotally connected together and each of said pair of scissor arms having a first end for engaging said frame and a second end for engaging said table top, one of said pair of scissor arms including a first pivot member pivotally connected to said table top and a second pivot member pivotally connected to said frame, the other of said pair of scissor arms including a first sliding member slideably connected to said table top and a second slideable member slideably connected to said frame so that said table top can move toward or away from said frame as said pair of scissor arms connecting said table top to said frame are extended or folded;
    a plurality of foldable springs having a first end, said first end including means for pivotally mounting said first end on said frame, said plurality of springs having a second end, said plurality of springs including means for pivotally connecting to one of said pair of scissor arms to provide a weight responsive lowering of said table top as more articles are placed on said table top;
    means for adjusting a compressive force on said plurality of springs, adjusting including rotatable bolts having spur gears that are interconnected to each other by a link chain engaging said spur gears;
    a cam located on one of said pair of scissor arms; and
    a cam follower connected to said plurality of springs, said cam follower engaging said cam to thereby provide a support surface for said plurality of springs as said table top is raised or lowered.

2. The self leveling table of claim 1 wherein said plurality of springs comprise compression springs.

3. The self leveling table of claim 2 wherein said first slideable member and said second slideable member include a roller for rolling in a guide slot in said self leveling table.

4. The self leveling table of claim 3 wherein said plurality of springs includes a threaded rod extending through said plurality of springs, said threaded rod including nuts to enable a user to further compress said plurality of springs.

5. The self leveling table of claim 1 wherein said self leveling table includes surfaces to enable a user with a forklift to lift said self leveling table.

6. The self leveling table of claim 5 wherein said self leveling table includes a flat top surface that extends beyond said frame.

7. The self leveling table of claim 6 wherein said self leveling table includes a cam bar having a first end connected to said cam follower and a second end connected to a second cam follower.

8. The self leveling table of claim 7 wherein said cam bar pivotally connects to further members that pivotally connect to said pair of scissor arms.

9. The self leveling table of claim 8 wherein said table top rests on said frame when said scissor arms are folded.

10. The self leveling table of claim 9 wherein said frame and said table top remain parallel to one another as said table top is raised or lowered.

11. The self leveling table of claim 1 wherein said plurality of springs includes at least one spring located concentrically inside of another of said springs.

* * * * *